US006120635A

United States Patent [19]
Sammis

[11] Patent Number: 6,120,635
[45] Date of Patent: Sep. 19, 2000

[54] TRANSFER SHEET FOR PERSONALLY COLORED DESIGNS

[76] Inventor: George L. Sammis, 1700 S. Eisenhower Ave., Mason City, Iowa 50401

[21] Appl. No.: 08/452,125

[22] Filed: May 26, 1995

Related U.S. Application Data

[62] Division of application No. 08/135,960, Oct. 13, 1993, Pat. No. 5,419,944, which is a continuation of application No. 07/779,626, Oct. 21, 1991, abandoned.

[51] Int. Cl.[7] .......................... B44C 1/165; B32B 31/00; B05D 1/36

[52] U.S. Cl. .......................... 156/230; 156/240; 156/283; 427/203

[58] Field of Search .................................... 156/230, 234, 156/283, 240; 427/203

[56] References Cited

U.S. PATENT DOCUMENTS

| | | | |
|---|---|---|---|
| 4,294,641 | 10/1981 | Reed et al. | 156/234 |
| 4,392,901 | 7/1983 | Pernicano | 156/155 |
| 4,496,618 | 1/1985 | Pernicano | 428/201 |
| 4,980,224 | 12/1990 | Hare . | |

FOREIGN PATENT DOCUMENTS

| | | |
|---|---|---|
| 330283 | 10/1935 | Italy . |
| 538678 | 8/1941 | United Kingdom . |

*Primary Examiner*—Curtis Mayes
*Assistant Examiner*—J. A. Lorengo
*Attorney, Agent, or Firm*—Howard & Howard

[57] ABSTRACT

A transfer sheet (10) for heat transferring a temperature-responsive decal having personally applied crayon coloring (22) onto a section of fabric (20). The transfer sheet (10) includes a paper sheet (12) treated with a release agent and a printed image (14) disposed directly thereon. A single uniform and transparent transfer layer (16) of thermoplastic material is disposed over the printed image (14) and other selected areas on the paper sheet (12). A plurality of abrasive particles (18) are partially embedded within the transfer layer (16) for abrading crayon (22) rubbed thereover and for enhancing the mechanical bond between the transfer layer (16) and the fabric (20) when the transfer sheet (10) is applied to the fabric (20).

10 Claims, 2 Drawing Sheets

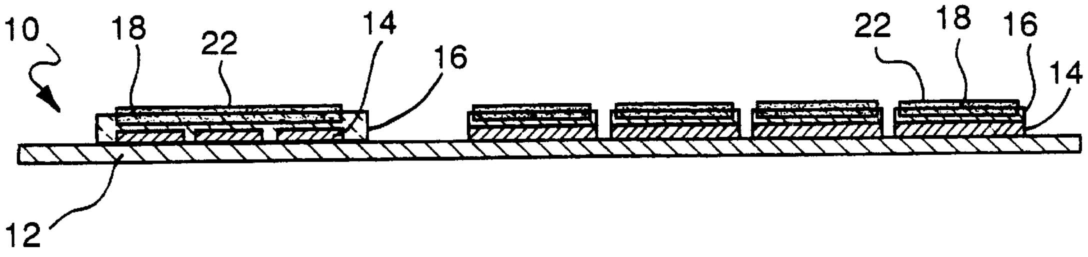
FIG - 4
FIG - 5
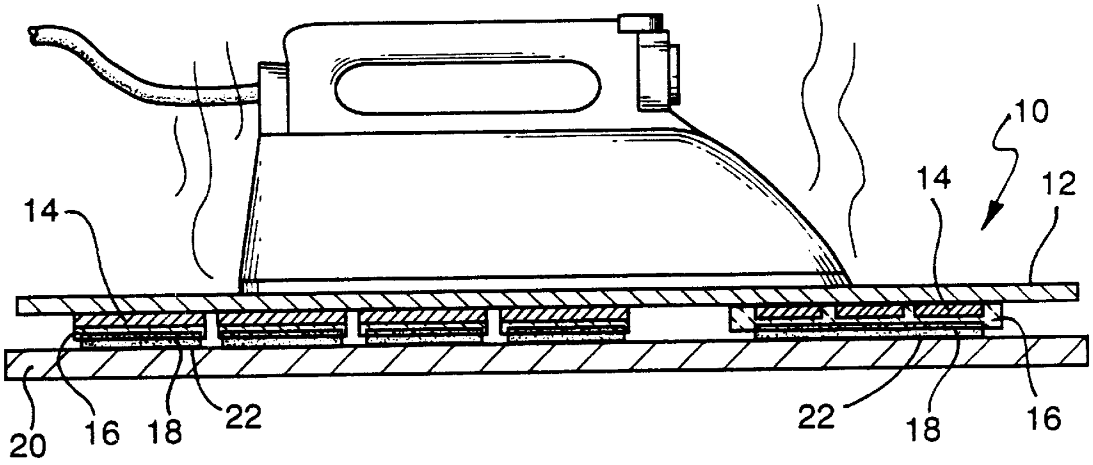
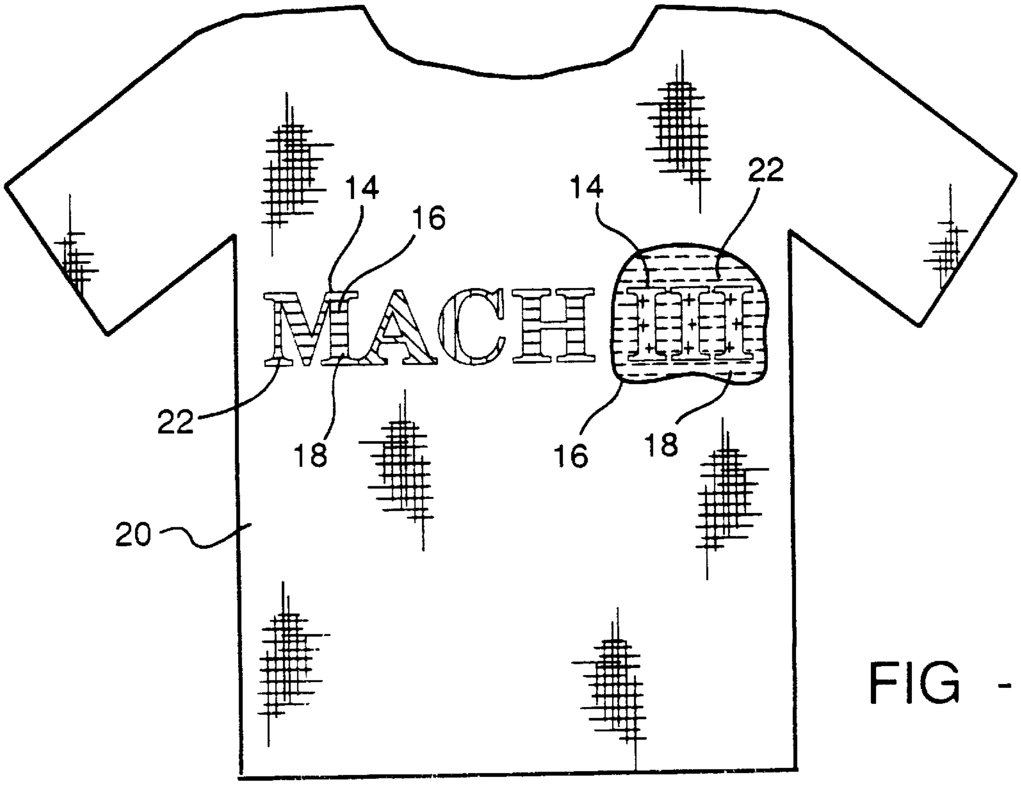
FIG - 6

TRANSFER SHEET FOR PERSONALLY COLORED DESIGNS

This is a divisional of application Ser. No. 08/135,960 filed on Oct. 13, 1993, now U.S. Pat. No. 5,419,944 which is a file wrapper continuation of Ser. No. 07/779,626 filed on Oct. 21, 1991, now abandoned.

TECHNICAL FIELD

The subject invention relates to a transfer sheet for transferring a temperature-responsive decal, and more particularly a decal having personally applied crayon coloring, onto a section of fabric.

BACKGROUND ART

Transfer sheets have become a popular way for consumers to individually decorate a T-shirt or other fabric clothing. Conventional transfer sheets utilize a heat-responsive transfer layer for affixing a preprinted decal onto fabric clothing. The transfer sheets are easy to apply, as the heat necessary to transfer the decal is no greater than that produced by a common household iron. The transfer sheets also come in a wide variety of designs to suit the differing tastes of consumers.

Transfer sheets are ideal for a merchant as he can stock an extensive library of designs without investing in a large number of T-shirts. Consumers are similarly benefitted as the large variety of designs available permit a more individualized T-shirt to be created.

In addition, the conventional transfer sheets enable consumers to select the exact location on the T-shirt they wish the design to be placed. This makes the use of transfer sheets even more attractive to the consumer who desires a uniquely decorated T-shirt.

However, even with the conventional transfer sheets, truly individualized designs were not possible. Consumers wish to create and color their own designs in ways that are appealing to them but perhaps different from the designs and color combinations selected by a manufacturer. However, the conventional transfer sheets are not suitable for drawing or coloring on, as the top surface of the sheet will not receive or retain ink, crayon or other markings.

Recently, colorable transfer sheets have been introduced which can be drawn and/or colored upon by the consumer to create individualized decal designs. These colorable transfer sheets comprise a sheet with a first layer of transfer material, a second layer of resin or other material and a plurality of abrasive particles embedded within the resin. The abrasive particles thus provide a suitable surface for receiving crayon, printing or other markings by creating an abrasive surface to receive these markings.

However, these transfer sheets are expensive to produce and include some undesirable characteristics. The U.S. Pat. No. 4,980,224 to Hare best illustrates the current consumer colored transfer sheets. The transfer sheet includes a treated paper sheet with a layer of transfer material disposed thereon. Furthermore, a second layer of resin or other material is placed on top of the transfer layer and contains abrasive particles embedded therein. The transfer material, layer of abrasive particles and resin cover the entire surface of the lower sheet in this patent. This design has a major deficiency in that a separate secondary layer of material must be used to affix the abrasive particles to the transfer sheet. In addition, the Hare '224 patent utilizes sugar or sand granules as the abrasive substance, and these particles retard the adhesion process between the transfer material and the fabric.

SUMMARY OF THE INVENTION AND ADVANTAGES

The present invention provides a transfer sheet for transferring a temperature-responsive decal having personally applied crayon coloring onto a section of fabric clothing. The transfer sheet comprises a paper sheet treated with a release agent layer. A single homogeneous and transparent transfer layer of thermo-plastic material is bonded directly to the release agent for releasing from the release agent in response to a predetermined elevated temperature. The present invention is characterized by a plurality of abrasive particles partially embedded within the transfer layer for abrading crayon rubbed thereover and for mechanically bonding to the fabric.

The abraded crayon is placed against fabric prior to heating. In this manner, the crayon is trapped between the fabric and the transfer layer in response to the applied temperature melting the transfer material and bonding the abrasive particles to the fabric. The crayon coloring is thus visible through the transfer layer thereby aesthetically enhancing the decal.

The invention also contemplates a method for fabricating a transfer sheet for transferring a temperature-responsive decal having personally applied crayon coloring onto a section of fabric clothing comprising the steps of: providing a paper sheet treated with a release agent layer disposed thereover; applying a single homogeneous and transparent transfer layer of fluidic thermoplastic transfer material directly onto the release agent on the paper sheet for bonding thereto in ambient conditions and for releasing therefrom in response to a predetermined elevated temperature; solidifying the transfer layer; and characterized by partially embedding a plurality of discrete abrasive particles within the transfer layer before the transfer layer is fully solidified to provide a rough surface for abrading crayon rubbed thereover and for mechanically bonding to the fabric.

The transfer sheet of the present invention eliminates the need for a separate layer of material to affix the abrasive particles to the transfer sheet. Rather, the present invention embeds the abrasive particles directly into the transfer material. Furthermore, the abrasive particles of the present invention are of a material which increases the adhesion between the transfer material and the fabric rather than retard this adhesion.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a cross-sectional view of the transfer sheet of FIG. 3 including a layer of crayon coloring disposed above the transfer material and contiguous the abrasive particles;

FIG. 5 is a cross-sectional view of the transfer sheet being applied to a section of fabric; and FIG. 6 is a front view of a T-shirt decorated with the colored decal design of the present invention.

DETAILED DESCRIPTION OF THE PREFERRED EMBODIMENT

Figure 1:
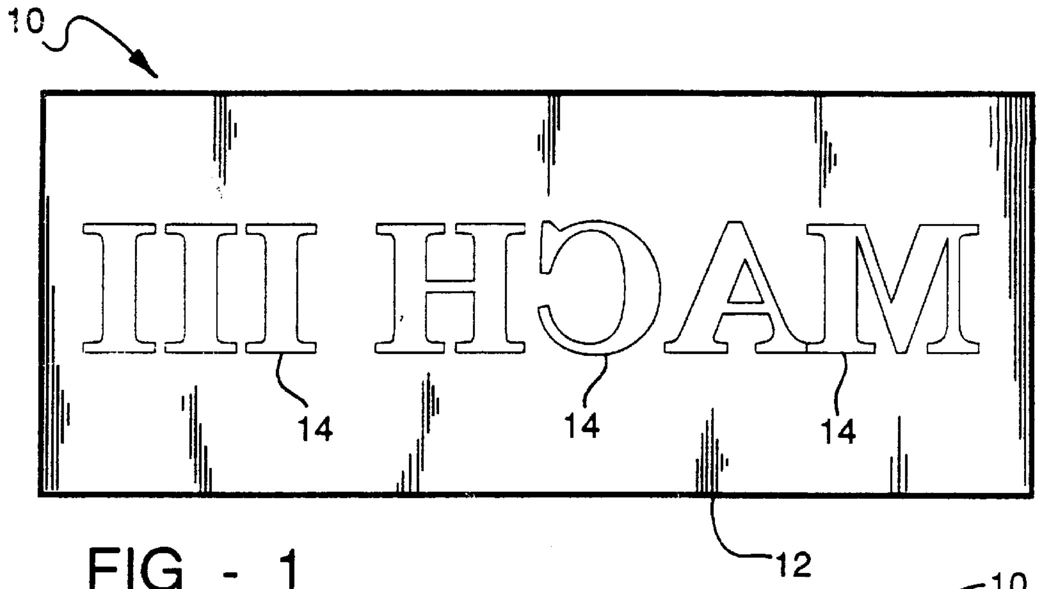
FIG. 1 is a top view of the paper sheet of the present invention including printing thereon.
Figure 2:
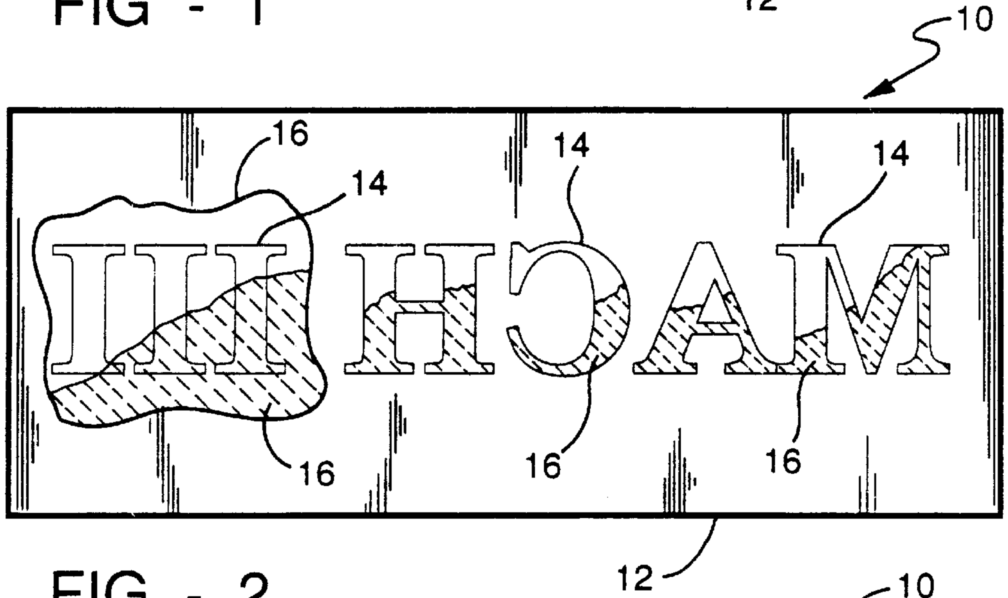
FIG. 2 is a top view of the paper sheet of FIG. 1 including a cut away view of a layer of transfer material covering portions of the printing.
Figure 3:
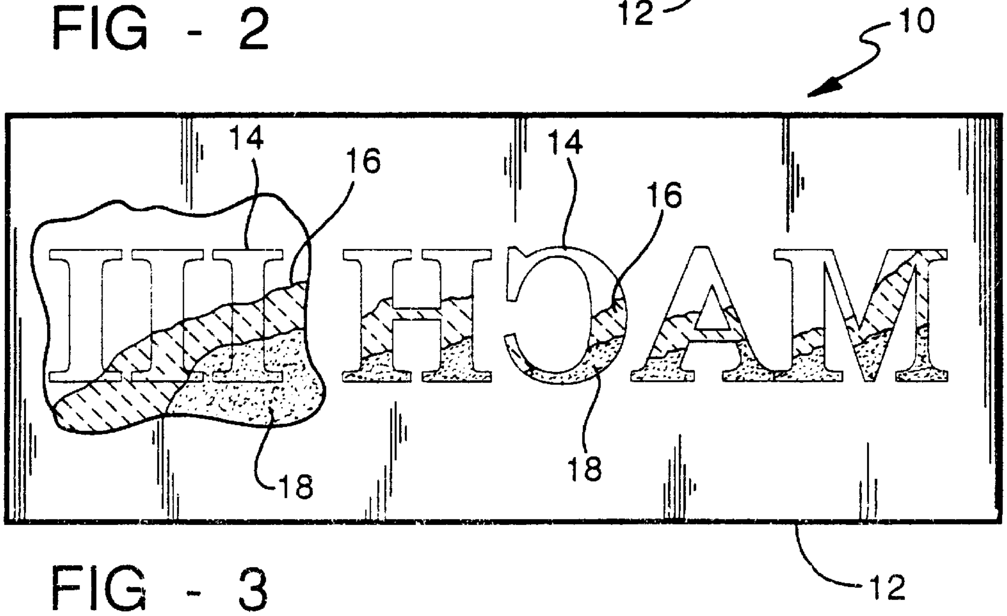
FIG. 3 is a top perspective view of the paper sheet of FIG. 2 including cut away view of a layer of abrasive particles partially embedded within the transfer material.

A transfer sheet for transferring a temperature-responsive decal having personally applied crayon coloring onto a section of fabric clothing is generally shown at 10. The transfer sheet 10 includes a sheet of commercially available treated paper 12 with printed matter 14 disposed thereon. A transfer layer 16 of thermoplastic transfer material is placed over the printed matter 14 and includes abrasive particles 18 embedded therein.

The paper sheet 12 comprises a quadrangle with four discrete boundaries or sides. Generally, a large paper sheet is cut into smaller squares or rectangles depending on the particular dimensions of the printed matter to be disposed thereon. The paper sheet 12 is coated with a release agent for bonding to the transfer layer 16. In ambient conditions, this bond securely holds the transfer layer 16 to the paper sheet 12. However, when the transfer sheet 16 is raised to a predetermined temperature, such as when heated with an iron, the paper sheet 12 releases the transfer layer 16. Thus, the paper sheet 12 can be pulled free leaving the transfer layer 16 behind. In the preferred embodiment the paper sheet 12 is treated with a release agent comprising quillon or silicone. However, any of the well known release agents which will cause the transfer layer 16 to be released when heated can be satisfactorily utilized.

The printed matter 14 is disposed directly adjacent the paper sheet 12 and underneath the transfer material 16. Hence, in the preferred embodiment, the printed matter is applied over the release agent before applying the transfer layer 16. The printed matter 14 defines a periphery which is dissimilar from the boundaries of the quadrangle-shaped paper sheet 12. Typically, screen printing or offset lithography methods are used to print images on the sheet. However, the printing could be accomplished by rotogravure, flexographic, letter press, or other mechanical means. In addition, in the preferred embodiment the printed image 14 merely forms an outline image defining a plurality of discrete areas suitable for coloring by a consumer, similar to the outline images found in children's coloring books. However, the preprinted image 14 is optional to the invention because the transfer sheet 10 will operate satisfactorily as a medium for transferring images created entirely from crayon.

The transfer material 16 is placed over the printed matter 14 and other selected areas on the paper sheet 12. In the preferred embodiment, the transfer material 16 follows the outline of the printed material 14 leaving the area outside the printed material 14 uncovered. In this manner the transfer sheet 10 will not transfer unwanted, uncolored sections of transfer material 16 onto a fabric section 20. Only the discrete areas defined by the printed matter 14 for coloring will be covered by the transfer material 16 and subsequently transferred to fabric. The transfer material 16 comprises a single, independent, homogeneous and transparent layer of thermoplastic material such as plastisol which liquifies upon heating during the transfer process. Other plastics could also be used for the transfer material such as acrylic or polyurethane.

The transfer material 16 is applied to the transfer sheet 10 while in a semi-solid state. Using screen printing methods, the transfer material 16 is selectively applied to the paper sheet 12 to cover the printed matter 14 and the other selected areas. The thickness of the transfer layer 16 can easily be changed by merely altering the mesh count of the screen during the screen printing process. A lower mesh count, i.e. larger holes in the screen, will result in more transfer material 16 applied to the paper sheet 12. The transfer material 16 is solidified, forming a strong mechanical bond with the release agent.

Before the transfer material 16 has fully congealed, however, a plurality of abrasive particles 18 are partially embedded therein. As exemplified by many deficient prior art transfer sheets, the smooth surface on the transfer material 16 is generally non-receptive to crayon, pencil or other types of printing. The inclusion of abrasive particles 18 within the transfer sheet 10 enables crayons to be abraded against the transfer sheet 10 as well as enabling other types of attrition based printing to be received by the transfer sheet 10. In addition, the placement of the abrasive particles 18 directly within the transfer layer 16 eliminates the need for a separate, additional layer of material for attaching the particles 18.

Beyond their abrasive qualities, the abrasive particles 18 are also adhesive in nature when activated by heat and are thus perhaps more accurately referred to as adhesive-abrasive particles 18. The adhesive-abrasive particles 18 of the preferred embodiment comprise ground polyester or nylon which are commonly used in the textile industry to adhere sections of fabric together. The adhesion can be strengthened by increasing the granule size of the adhesive-abrasive particles 18 to increase the mass of the adhesive-abrasive particles 18 on the transfer sheet. Thus, the adhesive-abrasive particles 18 form an extremely strong mechanical adhesive bond when melted into the fibers of a section of fabric 20. This greatly improves the wear characteristics of the transfer sheet 10 as it is unlikely that the transfer sheet 10 will separate from the fabric 20 even after repeated washings.

In operation, a consumer who desires personalized markings on selected portions of his transfer sheet 10 begins by printing on the transfer sheet 10. For example, a wax crayon 22 could be used to add color to the transfer sheet 10. The wax crayon 22 would be abraded against the abrasive particles 18 in order to produce the image 14. The transfer sheet 10 is then placed against a section of fabric 20 such as a T-shirt with the crayon 22, transfer material 16 and abrasive particles 18 sandwiched between the paper sheet 12 and the fabric 20. The transfer sheet 10 is then pressed with a heated iron until the crayon 22, transfer material 16 and abrasive particles 18 are fully melted and become enmeshed within the fabric 20. After the transfer sheet 10 has cooled, the paper sheet 12 is removed leaving a colored decal design on the fabric 20.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method for fabricating a transfer sheet (10) for transferring a temperature responsive decal having personally applied crayon coloring (22) onto a section of fabric clothing (20), said method comprising the steps of;

providing a paper sheet (12) treated with a release agent layer disposed thereof;

applying a transparent transfer layer (16) of fluidic thermo-plastic transfer material directly onto the release agent on the paper sheet (12) for establishing a discrete area of transfer material on the paper sheet (12) suitable for coloring by a consumer, the transfer layer (16) being adapted to bond to the release agent in ambient conditions and release therefrom in response to a predetermined elevated temperature;

solidifying the transfer layer (16);

and characterized by partially embedding a plurality of plastic adhesive-abrasive particles (18) on the transparent transfer layer (16) for providing a rough surface sufficiently rough for abrading crayon (22) rubbed thereover and for melting in response to heat to form an adhesive for enhancing the bond between the transfer material (16) and the fabric (20) and the fabric (20) to securely trap the abraded crayon therebetween.

2. The method of claim 1 further characterized by covering less than the entire area of the paper sheet (12) with the transfer material (16).

3. The method of claim 2 further characterized by printing an image (14) directly onto said paper sheet (12).

4. The method of claim 3 further characterized by printing the image (14) with a plurality of discrete areas for receiving different crayon colors.

5. The method of claim 3 further characterized by cutting the paper sheet (12) into quadrangles having four discrete boundaries.

6. The method of claim 5 further characterized by establishing a periphery of the image (14) similar from the four discrete boundaries of the quadrangle.

7. The method of claim 6 further characterized by establishing a periphery of the transfer layer (16) following the periphery of the printed image (14) thereby leaving uncovered spaces on the paper sheet (12) between at least one boundary thereof and the periphery of the transfer layer (16).

8. A method as set forth in claim 1 further characterized by partially embedding the adhesive-abrasive particles (18) within the fluidic transfer layer (16) prior to said step of solidification of the transfer layer (16).

9. The method of claim 1, further including the step of then rubbing a crayon over said adhesive-abrasive particles, such that said adhesive-abrasive particles remove a portion of said crayon onto said adhesive-abrasive particles.

10. The method of claim 1, wherein said adhesive-abrasive particles are formed of either polyester or nylon.

* * * * *